United States Patent [19]

Zimmer

[11] 4,399,718
[45] Aug. 23, 1983

[54] PIVOT DRIVE FOR MANIPULATOR

[75] Inventor: Ernst Zimmer, Friedberg, Fed. Rep. of Germany

[73] Assignee: Kuka Schweissanlagen & Roboter GmbH, Augsburg, Fed. Rep. of Germany

[21] Appl. No.: 267,756

[22] Filed: May 28, 1981

[30] Foreign Application Priority Data

May 29, 1980 [DE] Fed. Rep. of Germany ....... 3020378
Apr. 14, 1981 [DE] Fed. Rep. of Germany ....... 3115061

[51] Int. Cl.³ .......................... F16H 1/32; F16H 55/18
[52] U.S. Cl. ...................................... 74/409; 74/397; 74/410; 74/801; 414/4
[58] Field of Search ............... 74/395, 397, 409, 410, 74/801; 414/4, 5

[56] References Cited

U.S. PATENT DOCUMENTS 2,016,149 10/1935 Leach ............................... 74/409 X
3,108,498 10/1963 James et al. .......................... 74/801
4,106,366 8/1978 Altenbokum et al. ............ 74/410 X

FOREIGN PATENT DOCUMENTS 717517 1/1942 Fed. Rep. of Germany ........ 74/409
125719 5/1959 U.S.S.R. ................................. 74/409

Primary Examiner—Allan D. Herrmann
Attorney, Agent, or Firm—Karl F. Ross

[57] ABSTRACT

A pivot drive for interconnecting a pair of members that are relatively pivotal about a pivot axis has a torsion rod extending along a rod axis and rotatable by an appropriate drive relative to one of the members. This rod has outer ends carrying input gears of respective constant-mesh gear trains having output gears at least one of which is limitedly rotatable about the pivot axis on the other member. This one output gear can be limitedly rotated and locked in place in the other member so as torsionally to prestress the rod, thereby eliminating play from the drive by bringing the gears of one of the gear trains into snug contact in one direction and the gears of the other gear train into snug contact in the opposite directions.

14 Claims, 6 Drawing Figures

PIVOT DRIVE FOR MANIPULATOR

FIELD OF THE INVENTION

The present invention relates to a pivot drive. More particularly this invention concerns a pivot drive of the type used in a manipulator such as is used for remote-control laboratory experiments or automatic industrial processes.

BACKGROUND OF THE INVENTION

A manipulator normally has a carrousel or turntable base whose upper part can pivot about an upright axis relative to its lower part and which carries a lower arm pivotal in turn on this upper part about a horizontal axis. An elbow defining another horizontal axis at the other end of the lower arm carries an upper arm whose outer end is provided with a so-called mechanical hand that iself can pivot about several axes on the outer end of the upper arm. This hand can open and close. Individual drives normally incorporating transmissions effecting substantial stepdowns are provided for each degree of motion, that is for motion about each axis, normally with drive motors directly at the respective joints. Obviously it is essential that such a device, which either is controlled by an operator from a remote location or operates independently under computer control, be able to work with great position. Thus the mechanical hand must be at the exact location where it is supposed to be. Any substantial deviation of the actual position of the hand from the desired position makes the manipulator virtually useless.

Hence it is necessary to provide playfree pivot drives, that is drives which have no lost motion. Attempts to make the various mechanical parts of the pivot drives to very tight tolerances have largely failed, as the net effect of a few normally inconsequential slippages can result in a substantial misplacement of the mechanical hand at the outer end of the upper manipulator arm.

Accordingly various playfree pivot joints and drives have been suggested (see *Metallwissenschaft und Technik* #12 1969, pp. 1289ff) to ensure exact placement of the mechanical hand. A typical such joint uses a pair of meshing gears with angled teeth. The gears rotate about parallel axes and one of the gears is biased by a spring axially into tight mesh with the other gear, so that full-contact meshing is ensured at all times. Obviously the friction and losses in such an arrangement are great.

Another playfree joint is described in Austrian patent No. 189,469 of Apr. 10, 1957. Here a complex shaft arrangement incorporating a torsion rod and an outer tube shaft extends between rotatable and nonrotatable gears in a manner to substantially eliminate play. Once again the system has substantial backlash and friction.

OBJECTS OF THE INVENTION

It is therefore an object of the present invention to provide an improved pivot joint and drive usable in a manipulator.

Another object is the provision of such a joint usable in other devices, such as in gunnery systems, cranes, and the like.

SUMMARY OF THE INVENTION

These objects are attained according to the instant invention in a pivot drive for interconnecting a pair of members that are relatively pivotal about a pivot axis, and that comprises a torsion rod that extends along the rod axis and that had a pair of outer ends. This rod is connected to drive means for rotating the rod about the rod axis relative to one of the members. Respective constant-mesh gear trains are provided including respective input gears fixed on the outer rod ends and respective output gears connected to the other of the members and having respective centers. At least one of these output gears is limitedly angularly displaceable in the other member about the respective center. Means is provided for rotating the one output gear relative to the other member about the respective center for torsionally prestressing the torsion rod and for locking the one output gear in position with the torsion rod prestressed. Normally according to this invention the centers define an output-gear axis. The pivot axis of the two members coincides with at least one of the rod and output gear axes, and normally all three are coaxial.

The drive according to the instant invention therefore splits the force flow from the drive means to the other member in such a manner that play is completely eliminated from the path along which force is transmitted from the drive means to the other member. Since both of the output gears are fixed on the other member once the one output gear has been rotated to load the torsion rod, the ends of the torsion rod are effectively braced against the same part of the mechanism, which is advantageously forked so that each side has a respective output gear, in such a manner that excessive strain on the drive or associated parts is no problem. In addition the two input gears are urged without play into mesh with the respective gears of the respective gear trains.

According to this invention the gear trains are planetary-gear assemblies having sun gears formed by the input gears, ring gears formed by the output gears, and planet gears interconnecting the respective sun and ring gears. Such an arrangement allows a substantial stepdown to be achieved in the gear train while allowing all the parts to rotate about the central axis of the planetary-gear assembly.

According to another feature of this invention the other member is carried on the output gears. Thus any lost motion caused by the mounting of the other member is eliminated.

The one output gear according to this invention is formed relative to the respective center with a tangentially extending surface, normally the bottom of a groove. The means for rotating this one output gear has a bar lying on this surface and having bar ends spaced to either side of the respective output-gear center. Respective bolts threaded in the other member bear in a direction toward the respective output-gear center and perpendicular to the bar on the ends of this bar. Thus these bolts can be screwed in the other member to angularly displace the output gear and lock it rigidly in the desired position once the torsion bar has been prestressed enough to take all play out of the gear trains, and then the bolts can be locked in place to retain it in position. Such a tensioning arrangement can be provided for both output gears so that a great deal of adjustability is possible.

The drive means, which normally is a simple servomotor connected via a no-loss connection such as a tightly spanned toothed belt, may engage one end of the torsion rod, to which purpose the control rod will project somewhat axially beyond the respective outer end. Otherwise according to this invention the drive means is connected to the torsion rod between the outer ends thereof. To this end the torsion rod has a pair of halves respectively having the rod outer ends and joined together between the outer ends at a geometric center where they are both connected to the drive means. One half of the torsion rod at least may be a tube shaft so that the drive means can have a drive shaft extending through and braced by a bearing in this tube shaft to the geometric center where it is connected to both rod halves. The other half of the torsion rod may merely be an extension of the drive shaft, or both the rod halves may be tube shafts splined to an end of the drive shaft at the geometric center, in which case the two tube shafts are substantially identical. In this manner the assembly can be quite simple and compact.

DESCRIPTION OF THE DRAWING

The above and other objects, features, and advantages will become more readily apparent from the following, reference being made to the accompanying drawing, in which.

SPECIFIC DESCRIPTION

Figure 1:
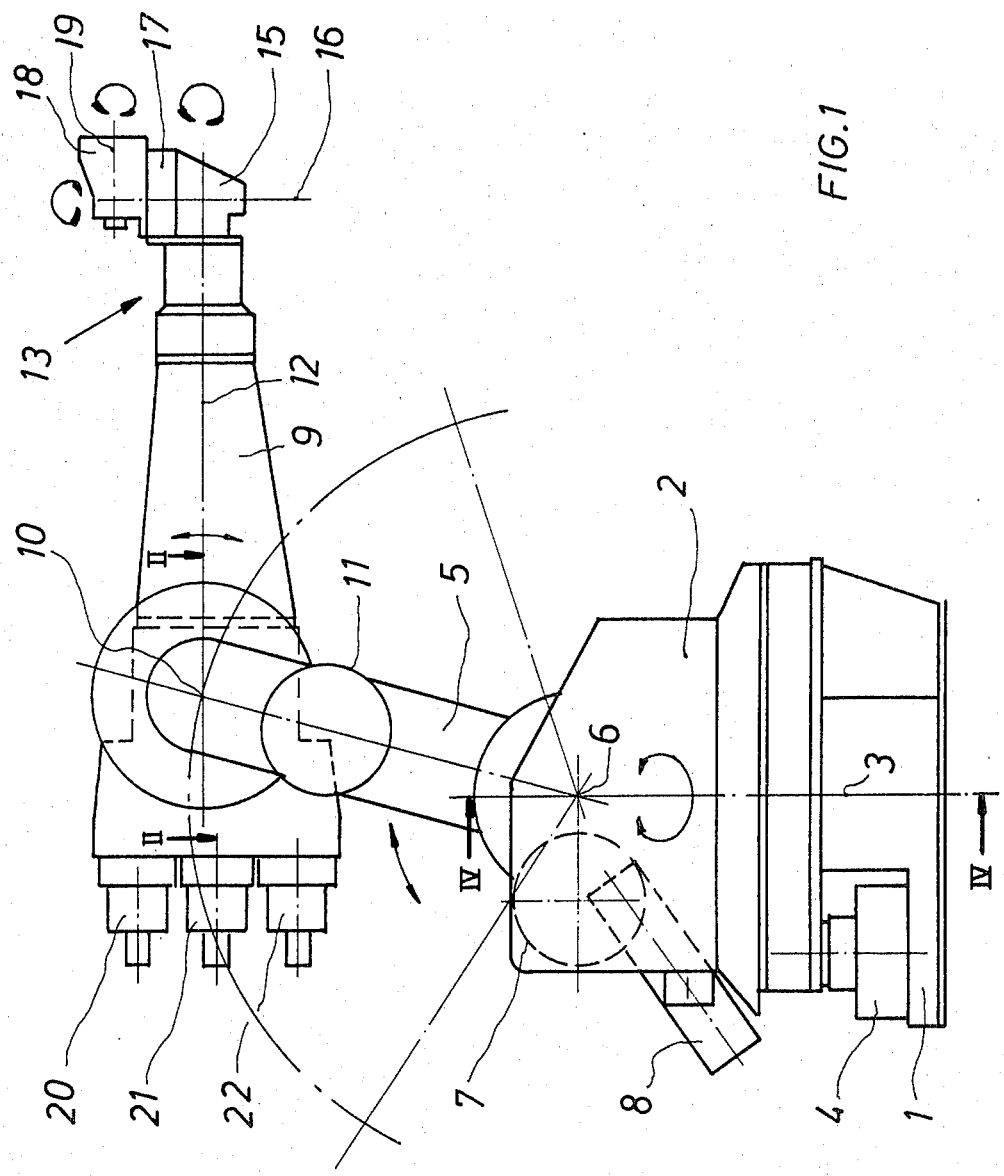
FIG. 1 is a side view of a manipulator using pivot drives according to the instant invention.

As seen in FIG. 1 a manipulator according to the instant invention has a fixed base or lower carrousel part 1 on on which an upper carrousel part 2 is rotatable about a vertical axis 3. A drive motor 4 on the base 1 can rotate this upper part 2 relative to the lower part 1 about the axis 3. A lower arm 5 is pivotal about a horizontal axis 6 on the upper carrousel part 2, with a respective motor 7 effecting such pivoting. An upper or outrigger arm 9 is in turn pivotal about another horizontal axis 10 parallel to the axis 6 on the upper and outer end of the lower arm 5, with a respective motor 11 effecting such pivoting.

The outer end of the upper arm 10 in turn carries a so-called mechanical hand 13 of conventional construction and rotatable in turn about the longitudinal axis 12 of the upper arm 9. The hand 13 has a corner piece 15 about which a short support arm 17 is pivotal about an axis 16 perpendicular to the axis 12. A connector part 18 can in turn pivot about an axis 19 parpendicular to the axis 16 and parallel to the axis 12 on the arm 17, and the not illustrated grab of the hand is carried on this part 18. Respective motors 20, 21, and 22 carried on the rear or inner end of the arm 12 control the motion of the parts 15, 17, and 18 about the respective axes 12, 16, and 19. The construction of this mechanical hand 13 is standard and does not form a critical part of the instant invention which can, as mentioned above, be employed in other machine systems.

Figure 2:
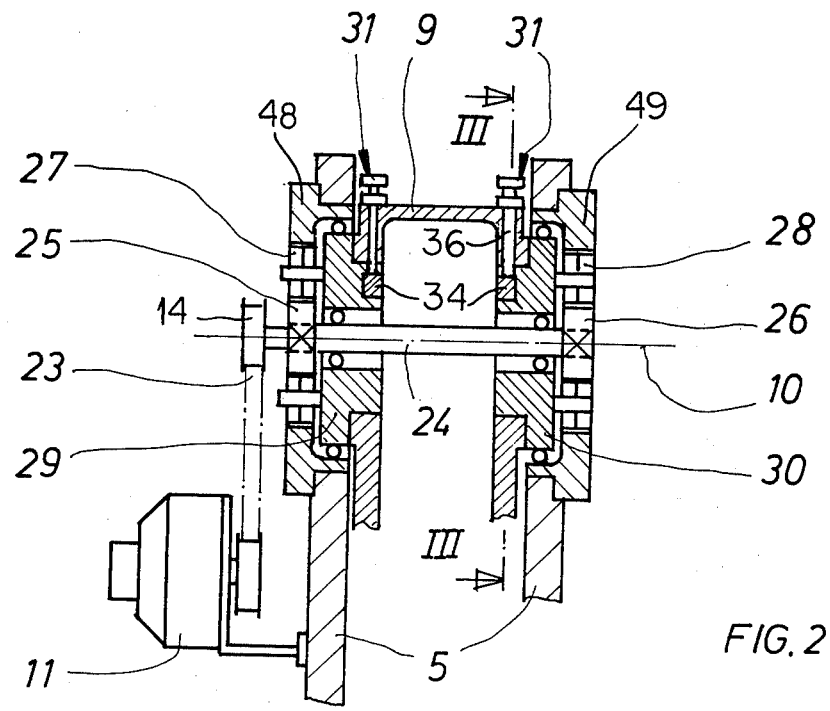
FIG. 2 is a section taken along line II—II of FIG. 1.

FIG. 2 shows how the motor 11 is connected via a toothed belt 23 to a pulley 14 carried on the extreme outer end of a torsion-rod drive shaft 24 centered on the axis 10 for the arm 9. The main part of this shaft 24 carries on its outer ends, one of which is slightly inward of the pulley 14, respective input pinions 25 and 26 connected here via respective stepdown gearing constituted by planet gears 27 and 28 to output gears 29 and 30 constituted by planet carriers and fixed on the arm 9. Outer ring gears 48 and 49 meshing with the planet gears 27 and 28 are fixed on the forked arm 5.

Figure 3:
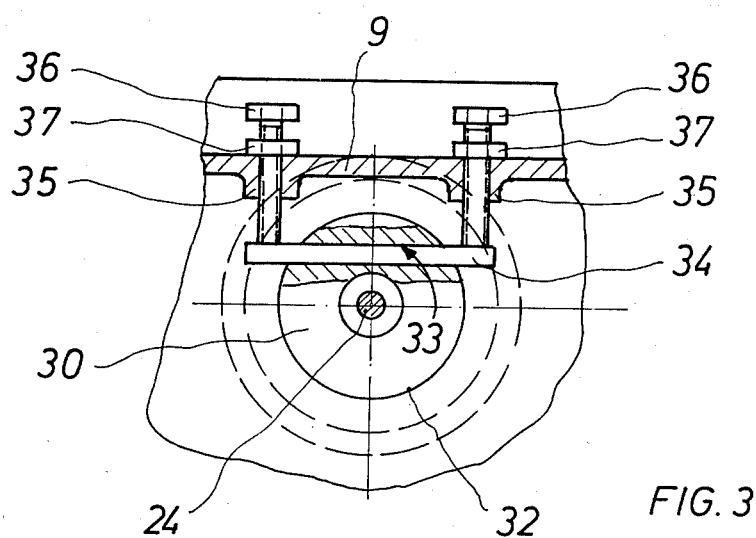
FIGS. 3 and 4 are sections taken respectively along lines III—III and IV—IV of FIGS. 2 and 1.

Tensioners or prestressing arrangements 31 are provided for limitedly angularly displacing the planet carrier 29 and 30 about the axis 10 relative to the arm 9. As shown in FIG. 3 the tensioner 31 for the carrier or output gear 30, which is identical to the tensioner 31 for the gear 29, comprises a pair of bolts 36 screwed in thickened portions 35 of the arm 9 and having ends bearing on a rigid bar 34 extending through a tangential groove 33 in the hub 32 of the gear 30. According to the instant invention these bolts 36 of each tensioner are alternately screwed out and screwed in, that is one of them is screwed out while the other is screwed in, to rotate the output gear 30 about the axis 10. This action twists the ends of the torsion shaft 24 relative to each other, bringing the gear train 25, 27, 48 on one side into tight mesh in one direction and the gear train 26, 28, 49 on the other into tight mesh in the opposite direction.

Thus when the motor 11 rotates the shaft 24 in one direction the gear train that is in tight mesh in that direction will respond immediately, without play, and vice versa. The result is a playfree pivot drive. In addition as the one gear train is mainly used in the direction it is loaded in, the other will be correspondingly unloaded to lessen friction and wear in the system according to this invention.

Figure 4:
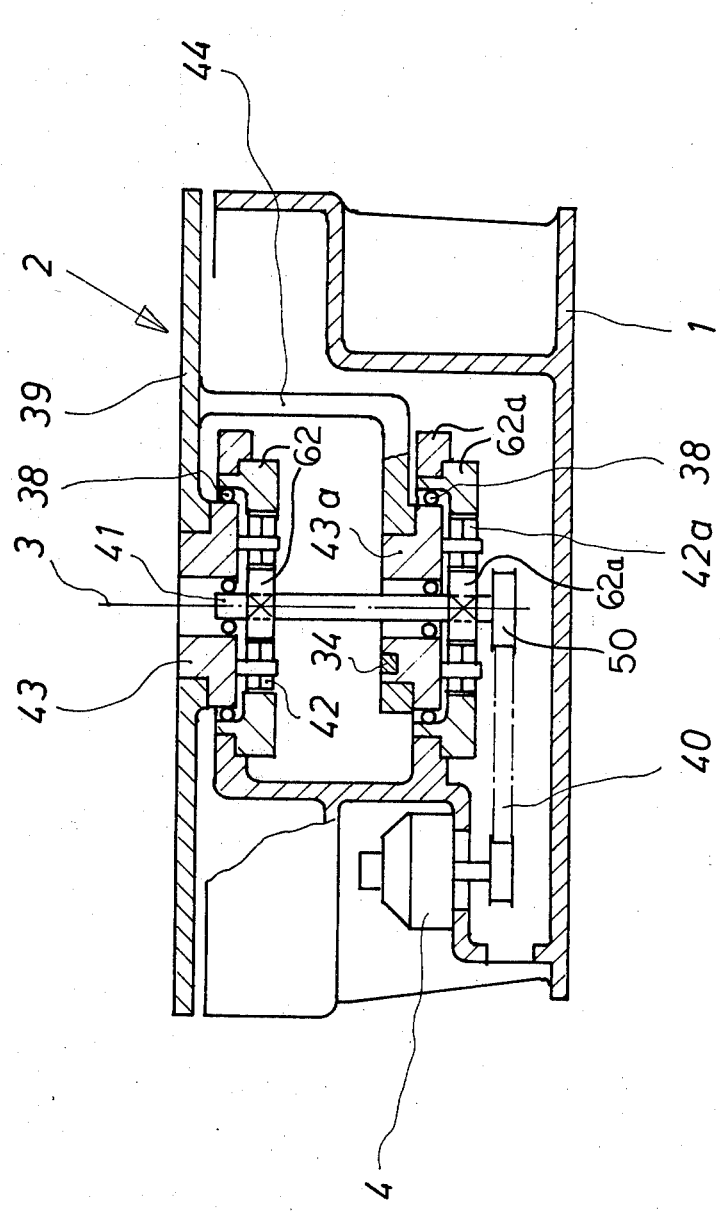

In FIG. 4 an arrangement is shown wherein the upper turntable part has a floor plate 39 formed with a double-wall region 44 and supported by bearings 38 on the lower part 1. The motor 4 for rotating the part 2 about the axis 3 relative to the part 1 has a toothed belt 40 engaging a pulley 50 carried on one end of a torsion-rod drive shaft 41 supported by bearings 61 in planet carriers 43 and 43a carried on the floor plate 39 and double wall 44, with the bearings 38 in turn carrying the part 2 on these carriers 43 and 43a.

The shaft 41 carries on its ends input gears 62 and 62a that mesh with respective planet gears 42 and 42a carried on the planet carriers 43 and 43a and that themselves mesh with respective ring gears 62 and 62a that are fixed on the lower part 1. Tension bars 34 are provided in a manner identical to that shown in FIG. 3 for prestressing the shaft 41.

Figure 5:
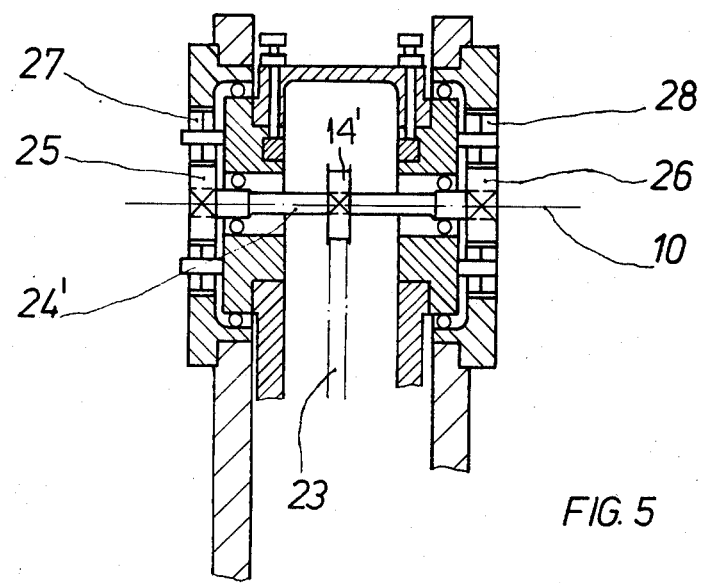
FIGS. 5 and 6 are sections respectively similar to FIGS. 2 and 4 through further pivot drives according to this invention.

FIG. 5 shows an arrangement substantially identical to that of FIG. 2, except that here a shaft 24' is provided which carries a pulley 14' at its geometric center. This style of construction makes the arrangement substantially more compact and evenly distributes forces in the shaft 24'.

In FIG. 6a a similar variation of the arrangement as shown in FIG. 3 is illustrated. Here the shaft 41' is half formed by a half 51 of a drive shaft 46 and half by a tube shaft 45 connected at splines 47 to the shaft 46. The outer end of the shaft 46 is splined at 52 to the one input gear 53 and the outer end of the tube shaft 45 is formed integrally with the other input gear 54. A bearing 55 is provided between the end of the shaft 46 opposite the gear 53 and the gear 54 formed on the tube shaft 45 to keep the shaft 46 perfectly centered. In all other respects this arrangement is identical to the arrangement of FIG. 3.

Figure 6:
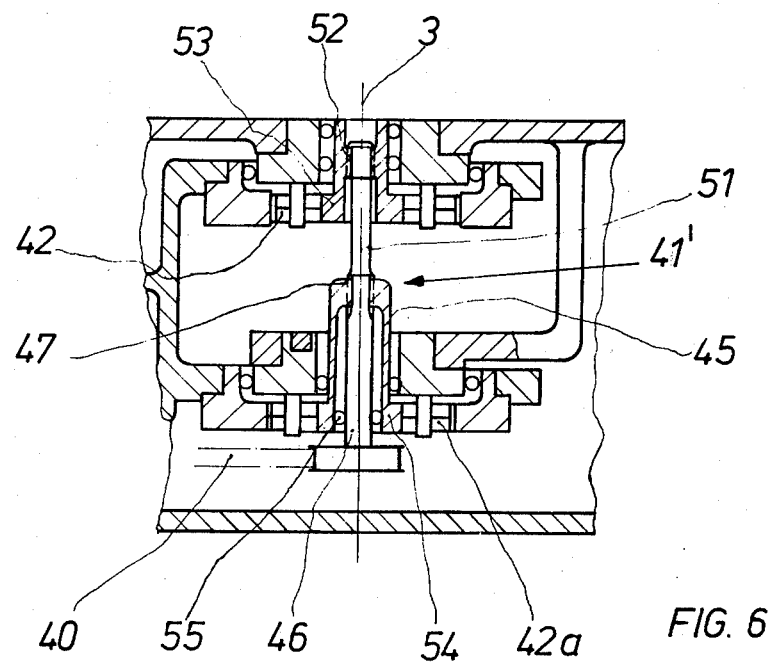
Figure 7:
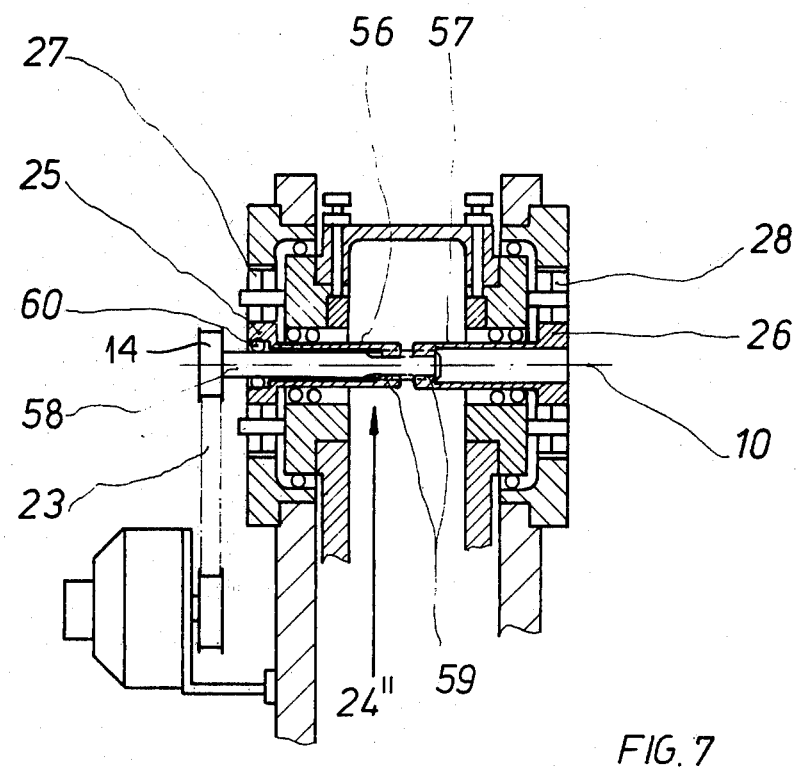
FIG. 7 is a section similar to FIG. 2 showing yet another pivot drive according to this invention.

Finally FIG. 7 shows a variation on the arrangement of FIG. 2 which applies the force to the center of the shaft 24" as in FIG. 5, but in the manner of FIG. 6. More particularly the torsion shaft 24" here is formed of a pair of identical tube shafts 56 and 57 both splined at their inner ends at 59 to one end of a drive shaft 58 whose other end is supported by a bearing 60 in the gear 25 formed on the outer end of the shaft 56. The outer end of the other shaft 57 is formed with the gear 26. In all other respects this arrangement is identical to that of FIG. 2.

It is of course possible to combine any of the features of any of the illustrated embodiments with any of the others. Similarly it is expected that the teachings with respect to a pivot drive for a given joint can be applied by the person skilled in the art to another joint without departing from the scope of the invention.

Thus with the system according to the instant invention it is possible to adjust the play out of the pivot joint so that extremely accurate response to the input movement will be insured at the hand 13. Even if the system wears it is possible to adjust out any resulting play with relative ease. At the same time the system will operate virtually without backlash, and with only modest friction as compared to the other prior-art pivot drives. Since the prestressing is wholly effective in a single mechanical element the system operates under very little strain.

I claim:

1. A pivot drive for interconnecting a pair of members that are relatively pivotal about a pivot axis, said drive comprising:
   a torsion rod extending along a rod axis and having outer ends;
   drive means for rotating said rod about said rod axis relative to one of said members;
   respective constant-mesh gear trains including respective input gears fixed on said outer ends and respective output gears connected to the other of said members and having respective centers, at least one of said output gears being limitedly angularly displaceable about the respective center relative to said other member; and
   means for rotating said one output gear relative to said other member about the respective center and thereby torsionally prestressing said rod and for locking said one output gear in position with said torsion rod prestressed.

2. The drive defined in claim 1 wherein said centers form an output-gear axis and all of said axes are coaxial.

3. The drive defined in claim 2 wherein said other member is carried on said output gears.

4. The drive defined in claim 3 wherein said one output gear is formed relative to the respective center with a tangentially extending surface, said means for rotating including:
   a bar lying on said surface and having bar ends; and
   respective bolts threaded in said other member and bearing in a direction generally toward the respective center on said bar ends, whereby said bolts can be screwed in said other member to displace said bar ends relative to said other member and to rotate said one output gear in said other member about the respective center.

5. The drive defined in claim 2 wherein said other member is forked and has a pair of axially spaced sides respectively holding said gear trains.

6. The drive defined in claim 2 wherein said drive means is connected to said torsion rod between said outer ends thereof.

7. The drive defined in claim 6 wherein said torsion rod has a pair of halves respectively having said outer ends and joined together between said outer ends at a geometric center, said drive means being connected to said rod at said geometric center.

8. The drive defined in claim 7 wherein at least one of said halves is a tube shaft, said drive means including a drive shaft extending coaxially through said tube shaft to said geometric center.

9. The drive defined in claim 8 wherein said halves are splined onto said drive shaft at said geometric center.

10. The drive defined in claim 9 wherein said halves are substantially identical tube shafts.

11. The drive defined in claim 9 wherein said drive means includes a bearing between said outer end of said tube shaft and said drive shaft.

12. The drive defined in claim 1 wherein said centers define an output-gear axis, said pivot axis coinciding with one of said rod and output-gear axes.

13. The drive defined in claim 1 wherein said gear trains are planetary-gear assemblies.

14. The drive defined in claim 13 wherein said assemblies each have:
   a sun gear constituting the respective input gear,
   a planet carrier constituting the respective output gear,
   a plurality of planet gears carried by said carrier and meshing with said sun gear, and
   a ring gear meshing with said planet gears and fixed on said one member.

* * * * *